March 31, 1964 R. E. BRATTON 3,127,459
PROCESS AND APPARATUS FOR MAKING PERFORATED BRICKS
Filed Jan. 11, 1962 3 Sheets-Sheet 1

INVENTOR.
RICHARD E. BRATTON
BY
Brown, Critchlow, Flick & Peckham
ATTORNEYS

March 31, 1964    R. E. BRATTON    3,127,459
PROCESS AND APPARATUS FOR MAKING PERFORATED BRICKS
Filed Jan. 11, 1962    3 Sheets-Sheet 3
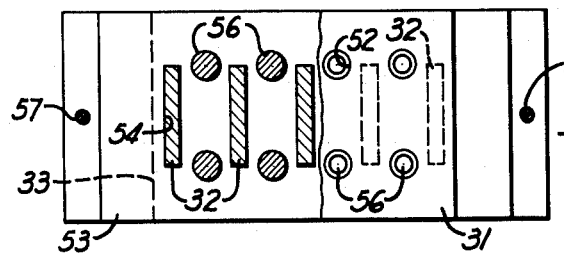
Fig.6
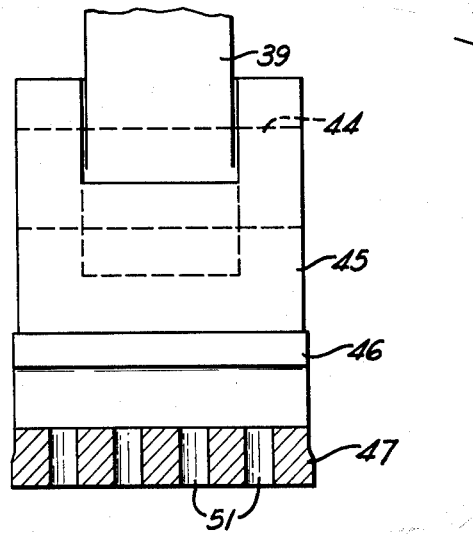
Fig.5
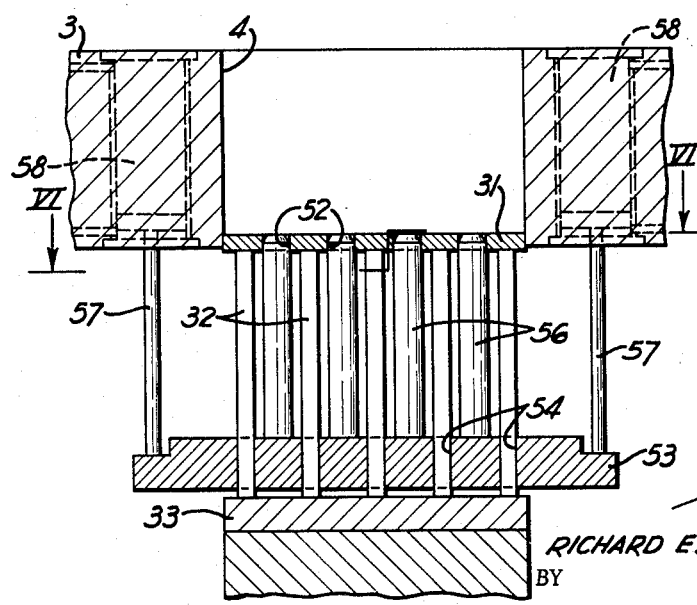
INVENTOR.
RICHARD E. BRATTON
BY
Brown, Critchlow, Flick & Peckham
ATTORNEYS United States Patent Office 3,127,459
Patented Mar. 31, 1964

3,127,459
PROCESS AND APPARATUS FOR MAKING
PERFORATED BRICKS
Richard E. Bratton, Fulton, Mo., assignor to Harbison-Walker Refractories Company, Pittsburgh, Pa., a corporation of Pennsylvania
Filed Jan. 11, 1962, Ser. No. 165,565
10 Claims. (Cl. 264—154)

This invention relates to a process and apparatus for making bricks having holes through them to reduce their weight and improve their thermal and heat exchange properties. Such bricks, in refractory compositions, are used as checkerbrick in the regenerators of iron blast furnaces.

For a full appreciation of my invention it needs to be comprehended that the forming of holed brick from free-flowing granular materials presents problems of a difficult nature, which are not encountered in forming such products from plastic deformable clay-type masses or blanks. In the latter type of manufacture a pre-formed blank or "clot," usually formed by extrusion, is fed to a press (frequently called a runner brick press) where it may be readily reshaped and provided with holes by forcing plungers or pins through the plastic mass, while ejecting the plastic material displaced by the pins. This practice cannot be followed with the semi-dry granular materials used in so-called power pressing or dry pressing. If preformed, as by the pressing of blanks, the granular pressed units would be brittle and non-yielding, and any attempt to reshape them by piercing would inevitably lead to fracturing or shattering them. The granular pressed ware, with which my invention deals, is formed at pressures ranging from about 1000 to 15,000 pounds per square inch.

Although granular power pressing is the most commonly used method of making refractory bricks, almost all of them have been simple plane surfaced shapes without holes. A pressing method which has been tried to some extent, but with great limitations which my invention overcomes, has been providing a mold chamber containing vertical pins, over which granular batch material is charged before pressing. I have found that the prohibitive brick breakage arising from that process is due to the impossibility of uniformly charging the granular material to so irregular a mold. I therefore conceived of means for first charging a mold of uncomplicated design, and then moving the hole-forming pins into position before compacting the material.

It is among the objects of this invention to provide a machine and process which molds bricks with holes through them, which performs the operation rapidly while the bricks are being molded, and which requires only minor modification of a conventional brick press.

In accordance with this invention the brick making machine has a table provided with a molding cavity that is open at top and bottom. A vertically movable pressure plate normally closes the bottom of the cavity and is provided with a plurality of vertical holes of the size that the brick is to have. Normally disposed above the cavity is a vertically movable top pressure plate provided with holes in line with those in the bottom plate. A number of pins are slidably disposed in the bottom plate holes and normally have their upper ends near the upper surface of the bottom plate. The usual means are provided for filling the molding cavity with granular brick-making material. Means also are provided for raising the pins in the bottom plate until their upper ends are substantially flush with the top of the table in order to form passages through the material in the mold. When the top pressure plate is moved down into the cavity around the raised pins the material is pressed into the form of a brick. After that is done the top and bottom plates are raised on the pins to lift the brick to the top of the molding cavity and strip it from the pins. The brick is then moved to one side of the cavity, which is refilled to form the next brick.

The preferred embodiment of the invention is illustrated in the accompanying drawings, in which FIG. 1 is a side view of a brick-making machine, partly broken away in central vertical section;

FIG. 5 is a further enlarged fragmentary vertical section taken on the line V—V of FIG. 1, showing the mold empty; and FIG. 6 is a horizontal section taken on the line VI—VI of FIG. 5.

Figure 1:
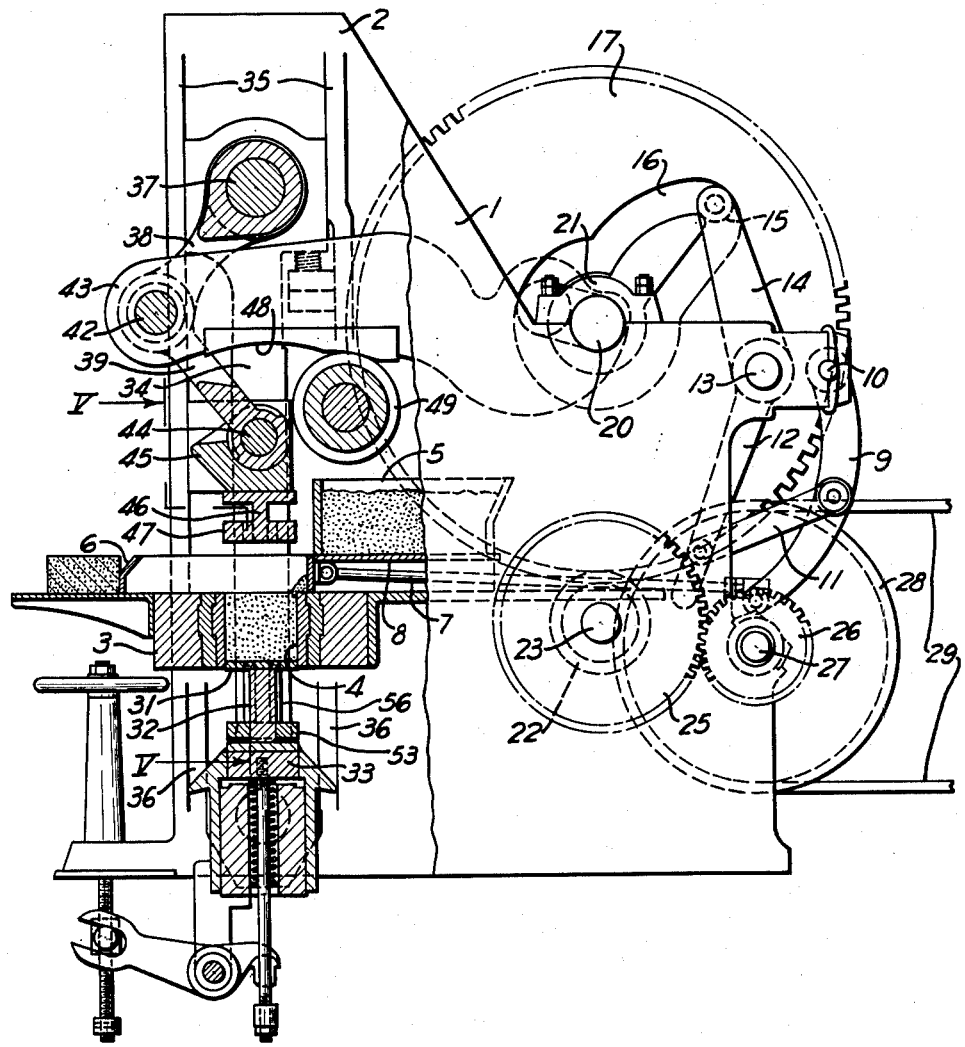

The brick-making machine may be formed by modifying part of the well-known Boyd brick press shown in Patent 987,124. As shown in the drawings herein, the machine has a pair of laterally spaced side frames 1 and 2, between the lower front part of which a table 3 is rigidly mounted. The table is provided with a rectangular molding cavity 4 that extends completely through it. At the back part of the table there is a hopper 5 that contains the granular material to be used in making bricks. The lower end of the hopper is spaced from the table by a charging box 6, which can be slid forward across the molding cavity by means of a rod 7 pivoted to the back of the box below its rear extension 8 and to an arm 9 suspended from a pivot 10 mounted in the side frames. The arm is swung back and forth by a link 11 that is pivotally connected to it and to the lower end of an arm 12 that straddles rod 7. The upper end of arm 12 is rigidly mounted on a horizontal rock shaft 13 journaled in the side frame of the machine. The lower end of another arm 14 is rigidly mounted on a projecting end of the rock shaft, and the upper end of this arm carries a cam follower roller 15 that travels in the groove of a cam 16 mounted on the inner side of a large gear 17. The gear is rigidly mounted on a projecting end of a crank shaft 20, the ends of which are mounted in bearings 21 in the side frames. The gear is driven by a pinion 22 on one end of a shaft 23 below it. This shaft likewise is journaled in both side frames, and its opposite end carries a gear 25 that is driven by a pinion 26 mounted on a shaft 27 behind it. This rear shaft is journaled in the side frames, from one of which it projects and carries a pulley 28 that is driven by a belt 29 from an electric motor (not shown).

When the charging box 6 filled with granular material is moved across the molding cavity, the material falls into the cavity and fills it as shown in FIG. 1. The material is retained in the cavity by a bottom pressure plate 31 that is supported in the bottom of the cavity by a plurality of vertical parallel bars 32 spaced lengthwise of the plate and supported by a crosshead 33. The latter is supported at its opposite ends by vertical side bars 34 that have enlarged ends guided in their vertical movements between ribs 35 and 36 on the side frames of the machine. The bars can be moved vertically far enough to lift the bottom pressure plate to a level flush with the top of the table. Journaled in the upper ends of the two side bars is a horizontal shaft 37, on which the upper end of a heavy toggle link 38 is pivotally mounted. The lower end of this link is provided with a central recess, in which the upper end of a lower toggle link 39 is disposed. The adjoining ends of these links are connected by a horizontal shaft 42, on the central portion of which the front end of a crank arm 43 is pivotally mounted. The lower end of the lower toggle link carries a shaft 44, the ends of which are mounted in a crosshead 45 that slides up and down in the side frames. This crosshead carries a plunger 46 that supports a top pressure plate 47 aligned with the molding cavity.

The rear end of crank arm 43 is journaled on the offset center of crank shaft 20. As the large gear is rotated, the toggle is straightened and broken by the crank arm, the bottom of which has cam surfaces 48 that move back and forth across a cam roller 49 journaled in the side frames. The action of the press is such that while the bottom pressure plate 31 is at the bottom of molding cavity 4, the top pressure plate 47 can be raised high enough to permit the charging box to move forward and beak beneath it, after which the toggle is straightened to move the top pressure plate down into the molding cavity to mold a brick therein. Then the side bars 34 are raised to lift the brick to the top of the cavity while the toggle and crank arm move the top pressure plate upward away from the brick so that the charging box can advance between the two plates again and push the brick forward onto the table in front of the molding cavity. This is the well-known action of a Boyd press.

Figure 2:
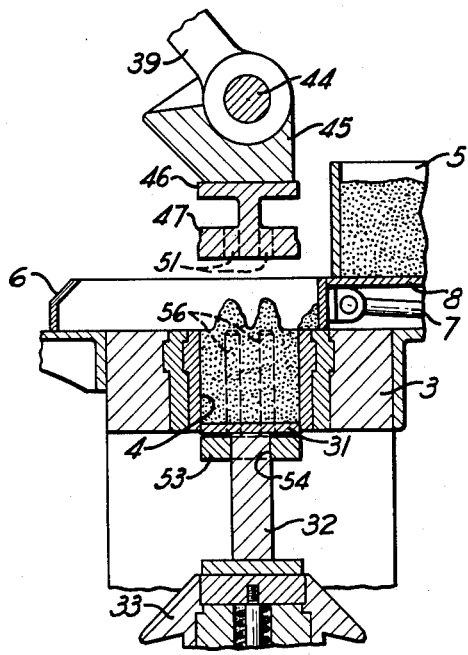
FIGS. 2, 3 and 4 are enlarged fragmentary vertical sections showing different steps in the process.

It is a feature of this invention that during the molding operation vertical holes or passages are formed in the brick to reduce its weight and improve its thermal properties. Accordingly, as shown best in FIG. 5, the top and bottom pressure plates are provided with a plurality of aligned vertical holes 51 and 52, respectively, which in size and number are the same as the holes that are to be formed in the brick. A pin plate 53 is disposed between the bottom pressure plate 31 and its supporting cross head 33 and extends lengthwise thereof. To permit this disposition of the pin plate, it is provided with rectangular openings 54, through which the vertical bars 32 extend. Rigidly mounted on the pin plate are vertical pins 56, corresponding in number and size to the holes 52 in the bottom pressure plate. The pin plate may be moved up and down on the bars by any suitable means, but preferably by vertical piston rods 57 extending up into hydraulic cylinders 58 mounted in the table at opposite ends of the molding cavity, as shown in FIG. 5. Fuid under pressure can be delivered to either end of the cylinders manually or automatically by any suitable means. In its lower position, the pin plate holds the pins with their upper ends near the upper surface of the lowered bottom pressure plate. In the upper position of the pin plate, the upper ends of the pins are substantially flush with the top of the table as shown in FIG. 2. At least, they should not project above the table because that would interfere with the movements of the charging box.

Figure 3:
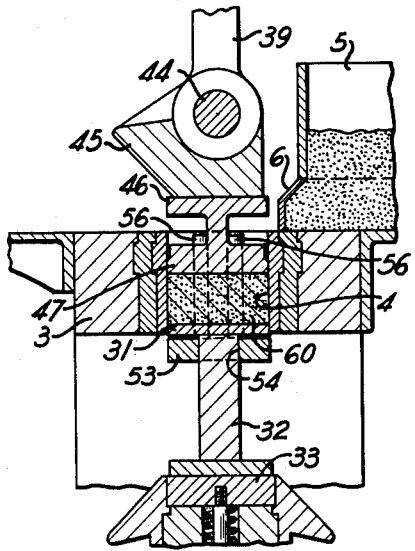
Figure 4:
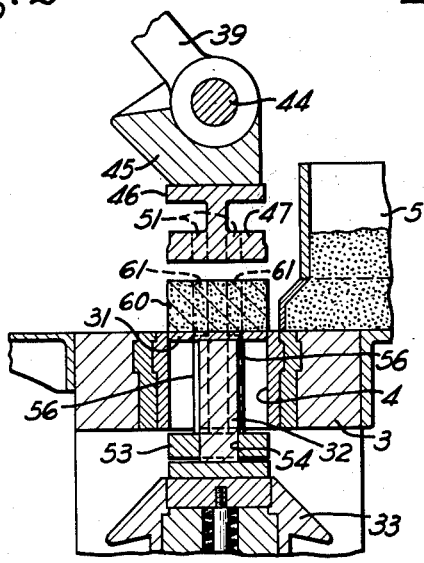

The operation of the press is as follows. With the bottom pressure plate 31 in the bottom of the molding cavity, the pin plate 53 is moved to its lowest position so that the tops of the pins likewise will be at the bottom of the cavity as shown in FIG. 1. The charging box 6 moves forward to fill the cavity with brick material, but before the charger is retracted the hydraulic cylinders 58 raise the pin plate so that the pins 56 will be forced up through the loose material in the mold to form vertical passages therethrough, as shown in FIG. 2. Then, as the charging box moves back to the hopper, it will carry with it the granular material pushed up out of the mold by the pins. The top pressure plate 47 then descends into the molding cavity to press the material therein into the form of a brick 60 having a predetermined thickness, as shown in FIG. 3. As the plate moves downward it slides down around the raised pins. Following the pressing operation, the bottom pressure plate and the top pressure plate are raised together to lift the brick from the mold and simultaneously strip it from the pins, as shown in FIG. 4. After the top plate has moved upward away from the brick, the charging box moves forward to push the brick onto the front part of the table. The brick, of course, contains a plurality of vertical holes 61 through it formed by the pins.

While illustrating my invention in connection with a toggle-actuated Boyd press, it is readily applicable to other presses whether of mechanical or hydraulic type. It also is applicable to vibration methods of forming. With this invention, perforated bricks can be produced by a brick machine at substantially the same rate as unperforated bricks. Also, the changes necessary in the machine for that purpose are relatively simple and inexpensive.

The granular batches used in forming brick by power pressing are by no means fine powders. This class of ware, instead, utilizes a graded mixture of particle sizes from as coarse as 4 mesh, down to much finer grains. By way of example, a batch made from 70% flint clay and 30% semi-hard or plastic clay will commonly show these grain sizes: 30% passing through 4 mesh and held by 10 mesh, 20% passing through 10 mesh and held by 20 mesh, 15% passing through 28 mesh and held by 65 mesh, and 35% passing through 65 mesh; the screens referred to being of the standard Tyler series. The industry practices wide latitude in this matter, but for the class of ware described, there would always be some material held on a 14 mesh screen. This distinguishes from the quite unrelated art of making such small pressed shapes as electrical porcelain, which would contain no material coarser than 14 mesh; nor generally any particles coarser than even 65 mesh screen. These matters are critical in mold charging problems, since the very fine powders tend to flow like water and therefore present only minimum difficulties.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In methods of fabricating apertured bodies from unconsolidated granular brickmaking material in which said material is delivered to a cavity and a pair of opposed dies are reciprocally movable within the confines of said cavity to compress material deposited therein to make self-sustaining bodies and in which a plurality of pins are used to make passages through the bodies, the improvement which comprises the steps of moving said pins through unconsolidated material deposited in said cavity to remove a quantity of material therefrom, and then leveling the top of the material remaining in the cavity to evenly distribute material about said pins within said cavity all prior to compressing said material.

2. That method of manufacturing apertured refractory checker brick and the like on a brickmaking press, said pressing including a brickmaking cavity and a pair of opposed upper and lower pressure plates arranged for reciprocal travel within said cavity to compress material therein, which comprises the steps of:

(a) filling a brickmaking cavity in a brickmaking machine with a mass of unconsolidated size graded brickmaking material, said material completely filling said cavity and being supported therein by the lower pressure plate, (b) passing a plurality of substantially parallel pins upwardly through said pressure plate and the unconsolidated brick material in said cavity until the tops of said pins are substantially even with the open top of said cavity, the tops of said pins removing a quantity of material from said cavity in their travel through the cavity, (c) removing from the top of the cavity the material which has been lifted therefrom by said pins in their travel through the material in said cavity, while simultaneously leveling the material remaining in said cavity, (d) compressing the material which remains in said cavity about said pins by causing the upper and lower pressure plates to compressively react against each other, (e) causing both the upper and lower pressure plates to slide upwardly on the pins while concurrently removing compressed material from said cavity, and (f) further lifting the upper plate a sufficient distance as to allow removal of a formed apertured checker brick or the like from the brick press.

3. In methods of fabricating apertured bodies from unconsolidated granular brickmaking material in which said material is delivered to a brickmaking cavity and a pair of opposed dies are reciprocally movable within the confines of said cavity to compress material deposited therein to make self-sustaining bodies, and in which a plurality of pins are used to make passages through the bodies, the improvement which comprises the steps of causing relative movement between the pins and the unconsolidated material deposited in said cavity to push quantities of said unconsolidated material from the cavity to the top thereof to form a plurality of passages therethrough, and then leveling the top of the material remaining in the cavity to evenly distribute unconsolidated material about said pins within the cavity, all prior to compressing said material.

4. A machine for making perforated brick, comprising a table provided with a brickmaking mold open at its top and at its bottom, a vertically movable bottom pressure plate normally positioned at the bottom of said mold to close it off to maintain brickmaking material therein, and a plurality of vertical holes formed through the bottom pressure plate, a vertically movable top pressure plate normally disposed above the mold and arranged to move downwardly into said mold, a plurality of holes aligned with said bottom plate holes formed through said top pressure plate, a plurality of vertical pins slidably disposed in said bottom plate holes and normally having their upper ends near the upper surface of the bottom plate, first means normally positioned adjacent one side of the mold arranged to slide on the table over the open top of the mold and back again to its starting position to fill the mold with granular brickmaking material and to level the material deposited in the mold after the pins have been raised therethrough, second means interconnected with said pins for raising the said pins through both the said bottom plate and the granular material in said mold until the upper ends are substantially flush with the top of the table, third means interconnected with the top plate for moving the said top plate down into said mold around the raised pins to press granular material into a brick, fourth means for raising the top and the bottom plates on the raised pins to lift the brick to the top of the mold and strip it from the pins, and correlating means cooperatively interconnecting the first, second, third and fourth means to operate them in the following tandem sequence: the first means to fill the mold, the second means to raise the pins, the first means to return it to its original position while leveling the material previously deposited in the mold, the third means to move the top pressure plate down into the mold to compress the granular material therein to form a brick, and fourth means to lift the top and bottom plates to remove a formed brick from the mold and the raised pins.

5. A machine according to claim 4 in which the second means includes fluid pressure cylinders mounted in the mold table beside the mold.

6. A machine according to claim 4 in which the bottom ends of the pins are mounted on a common plate which plate is raised and lowered by the second means.

7. A machine according to claim 6 in which the second means includes a pair of spaced extendable and retractable members interconnected to opposite ends of the common plate.

8. In apparatus of the type described the combination with a brick press having an open ended brickmaking mold, first means positioned at the bottom of the mold to close off the bottom of it to hold material therein, a source of unconsolidated granular material adjacent the mold, second means arranged to periodically remove a charge of unconsolidated material from said source and deliver it to said mold, said first means constructed and arranged to allow movable means to move upwardly with respect thereto into the mold, third means normally positioned above the mold arranged for compressive travel down to and within the mold, movable means arranged to remove some of the unconsolidated material from the mold to define a plurality of passages through the unconsolidated material which remains in the mold, said movable means arranged to maintain said passages through said material during subsequent compressive travel of said third means, and correlating means cooperatively interconnecting the first means, the second means, the third means and the movable means and arranged to actuate them in the following tandem sequence:

(a) the second means to remove a charge of unconsolidated material from the source thereof and deliver it to the mold, (b) the movable means to remove unconsolidated material from the mold to define a plurality of passages through said material, (c) the second means to return it to its original position and to level off the material in the mold, (d) the third means to compress the material within the mold, (e) the first and third means to remove the compressed material from the mold and the movable means, (f) the first means and movable means to return them to their original positions.

9. Apparatus according to claim 8 in which the movable means includes a plurality of substantially parallel, jointly movable pins arranged to move upwardly through the first means and material supported thereby in the mold.

10. Apparatus according to claim 8 in which the second means is arranged to remove previously compressed material from between the first and third means while refilling the mold.

References Cited in the file of this patent

UNITED STATES PATENTS

| | | |
|---|---|---|
| 1,543,068 | Eberling | June 23, 1925 |
| 1,965,758 | Armstrong | July 10, 1934 |
| 1,985,115 | Straub | Dec. 18, 1934 |
| 2,254,107 | Miller et al. | Aug. 26, 1941 |
| 2,542,874 | Locatelli | Feb. 20, 1951 |
| 2,723,436 | Campbell | Nov. 15, 1955 |
| 2,984,888 | Collens | May 23, 1961 |

FOREIGN PATENTS

| | | |
|---|---|---|
| 13,986 | France | June 9, 1911 |
| 2,731 | Great Britain | Feb. 3, 1910 |